(12) United States Patent
Zhao

(10) Patent No.: US 10,408,393 B2
(45) Date of Patent: Sep. 10, 2019

(54) COLORFUL LIGHT BEADS FOR A LIGHT STRING

(71) Applicant: Shandong Neon King Electronics Co., Ltd., Shandong (CN)

(72) Inventor: Qing En Zhao, Shandong (CN)

(73) Assignee: Shandong Neon King Electronics Co., Ltd., Shandong (CN)

( * ) Notice: Subject to any disclaimer, the term of this patent is extended or adjusted under 35 U.S.C. 154(b) by 0 days.

(21) Appl. No.: 15/848,994

(22) Filed: Dec. 20, 2017

(65) Prior Publication Data

US 2018/0172225 A1    Jun. 21, 2018

Related U.S. Application Data

(62) Division of application No. 15/843,820, filed on Dec. 15, 2017.

(30) Foreign Application Priority Data

| Dec. 20, 2016 | (CN) | 2016 2 1400228 U |
| Dec. 20, 2016 | (CN) | 2016 2 1400939 U |
| Dec. 20, 2016 | (CN) | 2016 2 1400941 U |

(51) Int. Cl.
*F21S 4/00* (2016.01)
*F21S 4/10* (2016.01)
(Continued)

(52) U.S. Cl.
CPC .  *F21S 4/10* (2016.01); *F21S 4/20* (2016.01); *G06F 3/04847* (2013.01);
(Continued)

(58) Field of Classification Search
CPC ....... F21Y 2101/02; F21K 9/00; F21V 29/004
(Continued)

(56) References Cited

U.S. PATENT DOCUMENTS

| 6,676,284 B1 | 1/2004 | Wynne Willson |
| 6,846,094 B2 | 1/2005 | Luk |

(Continued)

FOREIGN PATENT DOCUMENTS

| WO | WO 2005/084477 A1 | 9/2005 |
| WO | WO 2011/056242 A1 | 5/2011 |
| WO | WO 2013/021209 A1 | 2/2013 |

OTHER PUBLICATIONS

U.S. Appl. No. 15/843,820, Office Action dated Oct. 29, 2018.
EP Application No. 17208278.6, European Search Report dated Apr. 10, 2018.

*Primary Examiner* — Ahshik Kim
(74) *Attorney, Agent, or Firm* — Larry E. Henneman, Jr.; Henneman & Associates, PLC

(57) ABSTRACT

A light string includes a controller and a plurality of colorful light beads. The controller is electrically connected with the light beads and an AC electric supply, and the light beads are connected in series. Two voltage supply lines power the light beads, and control signals from the controller are fused with the power signal and passed to the light beads via the negative pole. The control signal is recognized by each light bead and also passed to the next light bead in the series, to produce a change in the output of each light bead (e.g., color, flashing pattern, etc.). The light beads include three LEDs of different color and can produce seven different colors. Multiple light segments can be connected and controlled by the same controller. The light string design is simple, yet versatile, offering many illumination outputs selectable by a user.

20 Claims, 13 Drawing Sheets

(51) Int. Cl.
  *H05B 33/08* (2006.01)
  *F21S 4/20* (2016.01)
  *G06F 3/0484* (2013.01)
  *H05B 37/02* (2006.01)

(52) U.S. Cl.
  CPC ..... *H05B 33/0845* (2013.01); *H05B 33/0857* (2013.01); *H05B 37/0272* (2013.01)

(58) Field of Classification Search
  USPC .................................................. 362/249.02
  See application file for complete search history.

(56) References Cited

U.S. PATENT DOCUMENTS

| | | |
|---|---|---|
| 6,933,680 B2 | 8/2005 | Oskorep et al. |
| 7,508,141 B2 | 3/2009 | Wong |
| 7,679,292 B2 | 3/2010 | Allen et al. |
| 8,492,990 B2 | 7/2013 | Neuman |
| 8,860,328 B2 | 10/2014 | McRae |
| 8,941,312 B2 | 1/2015 | McRae |
| 9,332,611 B2 | 5/2016 | Reidt |
| 9,510,406 B2 * | 11/2016 | McRae .............. H05B 37/0272 |
| 9,781,808 B2 * | 10/2017 | Jorgensen .............. H05B 37/02 |
| 10,009,971 B2 | 6/2018 | Chobot et al. |
| 2002/0089859 A1 | 7/2002 | Jackson et al. |
| 2010/0141161 A1 | 6/2010 | Hering et al. |
| 2012/0283878 A1 | 11/2012 | Roberts et al. |

\* cited by examiner

COLORFUL LIGHT BEADS FOR A LIGHT STRING

CROSS-REFERENCE TO RELATED APPLICATIONS

This application is a division of co-pending U.S. patent application Ser. No. 15/843,820, filed on Dec. 15, 2017 by the same inventor, which is incorporated by reference herein in its entirety. This application also claims foreign priority to China Utility Model Application No. 201621400939.8, filed on Dec. 20, 2016 by at least one common inventor, which is incorporated by reference herein in its entirety. This application also claims foreign priority to China Utility Model Application No. 201621400228.0, filed on Dec. 20, 2016 by at least one common inventor, which is incorporated by reference herein in its entirety. This application also claims foreign priority to China Utility Model Application No. 201621400941.5, filed on Dec. 20, 2016 by at least one common inventor, which is incorporated by reference herein in its entirety.

BACKGROUND OF THE INVENTION

Field of the Invention

This invention relates generally to light strings, and more particularly to a light sting having controllable multi-color light beads.

Description of the Background Art

At present, a conventional light bulb 100 may only change in dual-color. For example, FIG. 1 shows front and top structural schematic views of a dual-cup, dual-color light bulb 100, which has two light-emitting chips and provided inside of the package structure. The working mechanism is that when the power supply applies the positive half-cycle of an AC current, the first light-emitting diode (LED) 102 is turned on and a second LED 104 is turned off. Conversely, when the power supply applies the negative half-cycle of an AC current, LED 104 is turned on whereas LED 102 is turned off, thereby achieving the dual-color change of the light bulb 100. The light output options of conventional light bulb 100 are very limited.

SUMMARY

The present invention overcomes the problems associated with the prior art by providing a light string having a plurality of colorful light beads, where each of the light beads are capable of at least a seven-color change, so that the whole light string provides at least a seven-color change, with reduced consumption of manufacturing materials and convenient installation. The light beads are connected in series, and each light bead includes a light bead controller and a plurality of light-emitting elements (e.g., three or more). Control signals are encoded on one of the power supply wires of the light string by a light string controller and are passed from one light bead to the next to effect desired color changes.

In one embodiment, an LED light string includes a controller and a plurality of LED colorful light beads. A controller is electrically connected with the LED colorful light beads, and includes control circuitry for controlling the light beads. Additionally, the light beads are connected in series, and the controller is electrically connected with an AC electric supply.

In a particular embodiment, each of the LED colorful light beads is a single light bead that is capable of emitting light of different colors (e.g., seven or more). In another particular embodiment, if necessary, a current-limiting resistor is added to the series-connection circuit.

Each of the LED colorful light beads can include a first light emitting chip, a second light emitting chip, a third light emitting chip, and a light emitting control integrated circuit (IC) for controlling the light emitting state of the chips. Still more particularly, the first light emitting chip provides red light, the second light emitting chip provides green light, and the third light emitting chip provides blue light. In an even more particular embodiment, the first light emitting chip provides a red light source of 600-700 nm wavelength, the second light emitting chip provides a green light source of 500-600 nm wavelength, and the third light emitting chip provides a blue light source of 400-500 nm.

An LED light string having colorful light beads can also include matching (complementary) light string male and female connectors, which can be connected according to the actual needs of users without exceeding the maximum connection length allowed by the controller.

In another embodiment, an LED light string having colorful light beads further includes a controller having a power line female connector and a power plug. The power line female connector is inserted into the light string male connector, and the power plug is electrically connected with the AC electric supply.

Advantageously, the working mechanism of the LED light string is that within the controller, a control signal of the controller is fused and transmitted together with a power supply signal. That is, a control signal of the controller is transmitted to a first LED colorful light bead through, for example, the LED negative pole of the power supply circuit. After the light-emitting control IC in the first LED colorful light bead receives the signal, the first light-emitting chip, the second light-emitting chip and the third light-emitting chip of the light bead are controlled to emit light by the light-emitting control IC, while the control signal is fused to the output end of the first LED colorful light bead, and then transmitted to a second LED colorful light bead, and so on. Thus, the control signal is transmitted sequentially from one light bead to another, thereby achieving R/G/B full-color change of the whole product.

The invention provides the advantage that the LED light string having colorful light beads is designed based on the existing (two power wire) structure of a single-color change light string only by changing the light beads and by adding a connectable controller to achieve, in a particular example, a seven-color change. The invention also provides the advantage that multiple such light strings are connectable according to the actual needs of a user, such that the light string is expandable without exceeding the maximum connection length allowed by the controller.

In an exemplary embodiment, a light string includes a first voltage supply line, a second voltage supply line, and a plurality of light beads electrically coupled in series between the first and second voltage supply lines. Additionally, each of the light beads includes a plurality of light-emitting elements and a light bead controller configured to receive a control signal via at least one of the first and second voltage supply lines and, responsive to the control signal, selectively illuminate one or more of the light-emitting elements.

In a particular embodiment, each of the light beads includes first and second voltage supply terminals electrically coupled to the light bead controller and a voltage regulator electrically coupled between the first and second voltage supply terminals in parallel with the light bead controller. More specifically, the voltage regulator comprises a Zener diode.

In another particular embodiment, the first voltage supply terminal of a first light bead of the plurality is electrically coupled to the first voltage supply line, the second voltage supply terminal of the first light bead is electrically connected to the first voltage supply terminal of a second light bead, the first voltage supply terminal of the last bead is electrically connected to the second voltage supply terminal of a second-to-last light bead of the plurality, and the second voltage supply terminal of the last light bead is electrically coupled to the second voltage supply line. In some more particular embodiments, a current-limiting resistor is electrically coupled in series with the plurality of light beads and/or the light string can include a light string controller operative to assert a first and second drive voltages on the first and second voltage supply lines, respectively, and selectively assert the control signal on one of the first and the second voltage supply lines.

In yet another particular embodiment, the light bead controller includes a plurality of illumination programs and the control signal identifies the selected illumination program. The light bead controller is thus configured to illuminate one or more of the plurality of light-emitting elements in accordance with a selected one of the plurality of illumination programs.

In still another particular embodiment of the light string, the plurality of light-emitting elements of each of the light beads includes three light-emitting diodes (LEDs), each emitting a single color of light. Accordingly, each light bead is capable of generating any of seven different colors of light. In a more particular example, responsive to the control signal, some of the plurality of light beads display one color of the seven different colors and others of the plurality of light beads display a different color of the seven different colors. In a still more particular example, the plurality of light beads repeatedly switch between the plurality of light beads all displaying a same color of the seven different colors and the plurality of light beads displaying at least two different colors of the seven different colors.

In yet another particular embodiment, the light string includes a light string controller operative to assert a first drive voltage on the first voltage supply line, assert a second drive voltage on the second voltage supply line, and selectively assert the control signal on one of the first and the second voltage supply lines. The light string controller can also further include a user interface and control signal generation circuitry. The user interface is operative to receive a signal indicative of a selection of one of the plurality of illumination programs displayable by the plurality of light beads by a user, and the control signal generation circuitry is operative to generate the control signal based on the selected illumination program. The control signal can comprise a series of voltage pulses asserted on the one of the first and the second voltage supply lines.

The light string can also be separable and/or expandable. For example, in one embodiment, the light string includes a first connector electrically coupled to a first distal end of at least one of the first voltage supply line and the second voltage supply line and a second connector electrically coupled to a second distal end of at least one of the first voltage supply line and the second voltage supply line. Additionally, the first connector and the second connector are complementary such that multiple pluralities of serially-coupled light beads can be electrically coupled between the first and second voltage supply lines and be responsive to the control signal. In a more particular embodiment, the light string includes a light string controller having a third connector complementary to the first power connector.

A light string controller for controlling the illumination of a plurality of series-connected light beads of a light string is also disclosed. In an exemplary embodiment, the light string controller includes a first drive voltage terminal, a second drive voltage terminal, a voltage source configured to assert a first drive voltage on the first drive voltage terminal, and voltage control circuitry configured to selectively assert a second drive voltage and a control signal on the second drive voltage terminal. The first drive voltage terminal is configured to be electrically coupled to a first voltage supply line of a light segment, whereas the second drive voltage terminal is configured to be electrically coupled to a second voltage supply line of the light segment. The light segment includes a plurality of light beads electrically coupled between the first and the second voltage supply lines, and the control signal controls the light output of each of the plurality of light beads.

In a particular example, the voltage control circuitry is operative to assert any of a plurality of control signals on the second drive voltage terminal to identify any of a plurality of illumination programs displayable by the plurality of light beads. Optionally, the first and second drive voltage terminals are embodied in a connector configured to removably engage a complementary connector of the light segment.

In a more particular embodiment, the light string controller includes a user interface, coupled to the voltage control circuitry, that is operative to receive a selection signal indicative of one of the plurality of illumination programs selected by a user. Accordingly, the control signal asserted on the second drive voltage terminal by the voltage control circuitry identifies the selected illumination program.

In another more particular embodiment, at least one of the plurality of illumination programs comprises a multi-color illumination program, where the multi-color illumination program causes the plurality of light beads to repeatedly switch between the plurality of light beads all displaying a same color and the plurality of light beads collectively displaying at least two different colors.

In a light string controller, a method for controlling the illumination of a plurality of light beads electrically coupled to the light string controller is also disclosed. An exemplary method includes the steps of asserting a first drive voltage on a first drive voltage terminal of the light string controller, asserting a second drive voltage on a second drive voltage terminal of the light string controller, receiving a program selection signal via a user interface, and asserting a control signal on at least one of the first and second drive voltage terminals to communicate the control signal to the plurality of light beads. The first and second drive voltage terminals are configured to be electrically connected to a first and a second voltage supply lines of a light segment, respectively, where the light segment includes the plurality of light beads electrically coupled between the first and the second voltage supply lines. Additionally, the program selection signal is indicative of an illumination program selected from a plurality of illumination programs, where each of the illumination programs determines a light output of the plurality of light beads, and the asserted control signal is indicative of the selected illumination program. In a particular method, asserting the control signal includes asserting a series of voltage pulses on the second drive voltage terminal.

Another particular method further includes a step of asserting the second drive voltage on the second drive voltage terminal following the step of asserting of the control signal. A more particular method further includes the steps of receiving a second program selection signal via the user interface, where the second program selection signal indicates a second illumination program selected from the plurality of illumination programs, and asserting a second control signal indicative of the second illumination program on the second drive voltage terminal.

Light beads and their operation are also described in detail. A light bead according to an exemplary embodiment includes a first voltage supply terminal, a second voltage supply terminal, a light bead controller electrically coupled between the first and the second voltage supply terminals, and a plurality of light-emitting elements electrically coupled between the light bead controller and the second voltage supply terminal. The light bead controller is configured to detect a control signal asserted on at least one of the first voltage supply terminal and the second voltage supply terminal and selectively illuminate one or more of the plurality of light-emitting elements to control the light output of the light bead in accordance with the control signal.

In a particular embodiment, the light bead further includes a voltage regulator electrically coupled between the first and second voltage supply terminals in parallel with the light bead controller. In a more particular example, the voltage regulator includes a Zener diode, and even more specifically, the light bead controller can include a first input terminal coupled to the first voltage supply terminal and a positive side of the Zener diode, a second input terminal coupled to the second voltage supply terminal and a negative side of the Zener diode, and a plurality of drive terminals. Each of the plurality of light-emitting elements is electrically coupled between one of the plurality of drive terminals and the second voltage supply terminal.

In another particular embodiment, the light bead controller is further configured to store a plurality of illumination programs, select one of the plurality of illumination programs based on the control signal, and illuminate one or more of the light emitting elements in accordance with the selected illumination program.

In yet another particular embodiment, the plurality of light-emitting elements comprises a first light-emitting diode (LED) configured to emit a first color of light, a second LED configured to emit a second color of light, and a third LED configured to emit a third color of light. Additionally, the first, second, and third colors of light are different, and the light bead is capable of emitting any of seven different colors of light depending on which of the first, the second, and the third LEDs are illuminated simultaneously.

In a more particular embodiment, the first LED provides a red light source of 600-700 nm wavelength, the second LED provides a green light source of 500-600 nm wavelength, and the third LED provides a blue light source of 400-500 nm wavelength.

In another more particular embodiment, the light bead is configured to be electrically coupled as one of a plurality of the light beads of a light string, the light string comprises a first voltage supply line and a second voltage supply line, and the plurality of the light beads are electrically connected to each other in series between the first voltage supply line and the second voltage supply line. Still more particularly, responsive to the control signal, some of the plurality of light beads are configured to display a first one of the seven different colors and others of the plurality of light beads are configured to display a second one of the seven different colors. Even more particularly still, the plurality of light beads can be further configured to repeatedly switch between the plurality of light beads all displaying a same color of the seven different colors and the plurality of light beads displaying at least two different colors of the seven different colors.

In yet another more particular embodiment, the light string includes a light string controller operative to assert a first and second drive voltage on the first and second voltage supply lines and encode the control signal on the second voltage supply line as a series of voltage pulses.

A light bead according to another exemplary embodiment includes a first voltage supply terminal, a second voltage supply terminal, a light bead controller electrically coupled between the first and the second voltage supply terminals, a plurality of light emitting elements, means for detecting control signals, and means for transmitting the control signals out of the light bead via the first voltage supply terminal to a next light bead in a series of light beads. In this embodiment, the light bead controller is configured to detect control signals communicated via the second voltage supply terminal and, responsive to the control signals, selectively provide power to one or more of a plurality of power terminals in accordance with the control signal to display an associated one of a plurality of predetermined light outputs. Additionally, each light-emitting element is electrically coupled between an associated one of the plurality of power terminals and the second voltage supply terminal.

In a light bead having a plurality of light-emitting elements, a method for controlling the light output of the light bead is also disclosed. The method includes the steps of receiving a first drive voltage asserted on a first voltage supply terminal of the light bead, receiving a second drive voltage asserted on a second voltage supply terminal of the light bead, detecting a control signal asserted on the second voltage supply terminal, selecting one of a plurality of predetermined illumination outputs of said light bead based on said control signal, and powering one or more of the plurality of light-emitting elements to cause the light bead to provide the selected illumination output.

According to a particular method, the step of detecting the control signal comprises detecting a series of voltage pulses asserted on the second voltage supply terminal. Still more particularly, a voltage between the first and the second voltage supply terminals is regulated, and the step of detecting the control signal comprises detecting changes in available current between the first and the second voltage supply terminals.

In another particular method, each of the plurality of illumination outputs is associated with a different control signal. More particularly, the plurality of illumination outputs can include a plurality of different colors and/or one or more flashing outputs. Still more particularly, one or more of the outputs can define a colored light output of the light bead that forms a component of a multi-colored light output provided by a light string incorporating the light bead and other light beads. For example, according to one method where the light bead includes three light-emitting diodes (LEDs), each emitting light of a different color, the control signal identifies one of at least 32 different selectable illumination outputs.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a light string having a plurality of colorful light beads, where each of the light beads is capable of at least a seven-color change. The light beads are controlled using encoded control signals asserted on one of the power supply wires of the light string and are passed from one light bead to the next to effect the desired color changes. In the following description, numerous specific details are set forth (e.g., particular voltages, particular specifications of components, particular encoding techniques, etc.) in order to provide a thorough understanding of the invention. Those skilled in the art will recognize, however, that the invention may be practiced apart from these specific details. In other instances, details of well-known low-voltage lighting components (e.g., light diffusers, etc.) and manufacturing practices (e.g., light string assembly) have been omitted, so as not to unnecessarily obscure the present invention.

Figure 1:
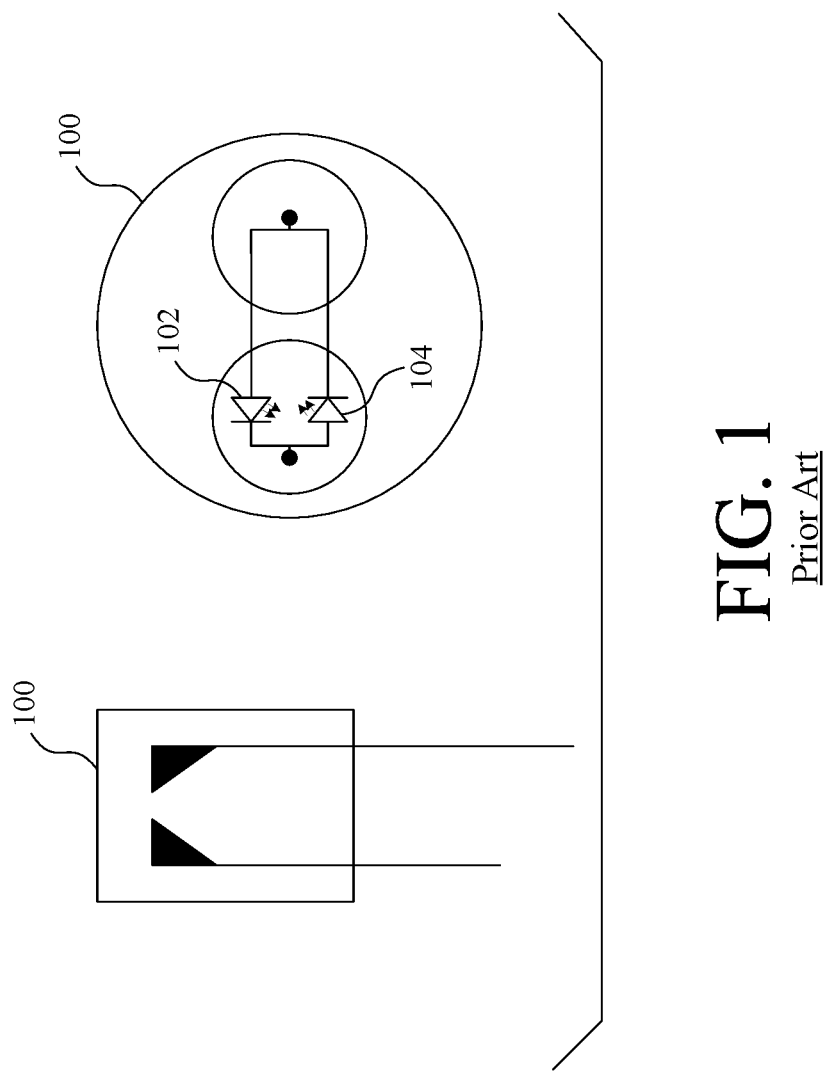
FIG. 1 shows side and top structural schematic views of a prior art dual-cup dual-color LED light bulb.
Figure 2:
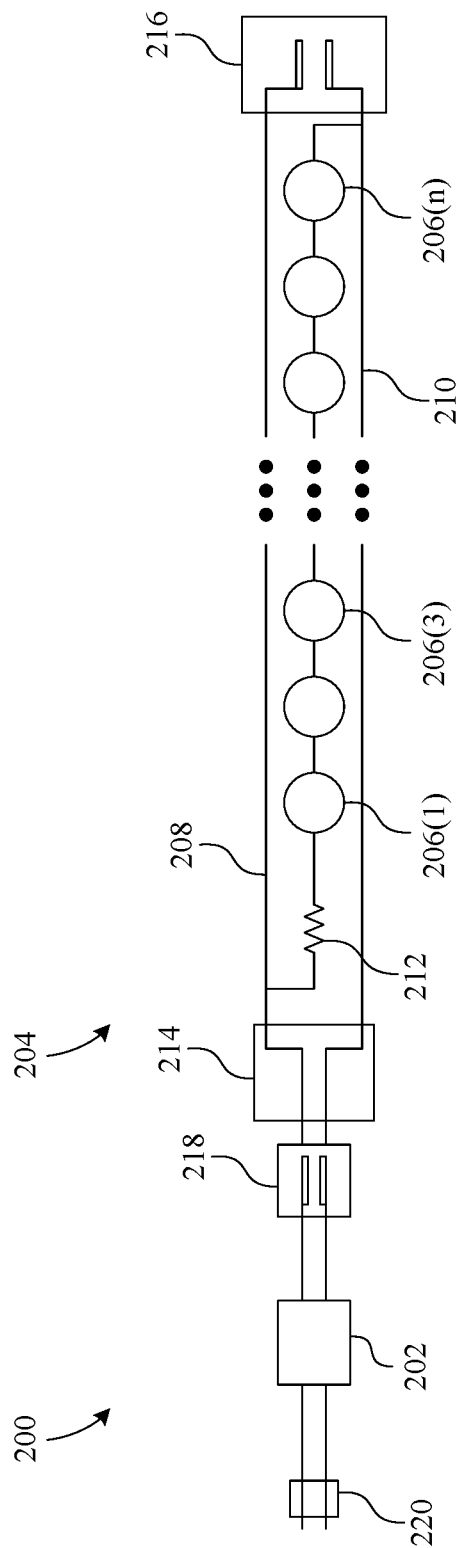
FIG. 2 is a structural schematic view of a light string according to an embodiment of the present invention.

FIG. 2 is a structural schematic view of a light string 200 having colorful light beads according to one embodiment of the invention. Light string 200 includes a light string controller 202 and a light bead segment 204. Light bead segment 204 includes a plurality of light beads 206(1-n) connected in series between a first (positive) voltage supply line 208 and a second (negative) voltage supply line 210. Current flows from first voltage supply line 208 to second voltage supply line 210 via the serially-connected light beads 206(1-n) and, in some embodiments, through a current limiting resistor 212 included in the series-connected circuit with the light beads 206(1-n). While light beads 206(1-n) are shown only representationally in FIG. 2, additional structure is described in FIG. 3.

Light segment 204 also includes a first connector 214 (e.g., a male connector, etc.) and a second connector 216 (e.g., a female connector, etc.). First connector 214 is electrically connected to first and second voltage supply lines 208 and 210 at a first distal end of light segment 204, whereas second connector 216 is electrically connected to first and second voltage supply lines 208 and 210 at a second distal end of light segment 204. Connectors 214 and 216 are complementary, such that the male connector 214 of a second light segment 204(2) (not shown) can be engaged with the female connector 216 of light segment 204 to lengthen the light string 200. Thus, multiple light segments 204 can be electrically connected together according to the actual needs of a user, without exceeding the maximum connection length permitted by light string controller 202. The maximum number of connectable light segments 204 will vary depending on the maximum current rating of the controller 202, the number of beads 206(1-n) in each light segment 204, etc.

Light string controller 202 also includes a connector 218, which provides a removable connection to first connector 214 of light segment 204. When connected with light segment 204, connector 218 enables driving voltages and control signals from light string controller 202 to be asserted on respective voltage supply lines 208 and 210 and transmitted to light beads 206(1-n). Light string controller 202 also receives power via a power plug 220, which connects controller 202 with an AC electric supply (e.g., a wall outlet), thereby providing 120V AC source power for light string 200. A circuit is completed via the light string controller 202, first voltage supply line 208, current-limiting resistor 212, the series-connected light beads 206(1-n), second voltage supply line 210, and connectors 218 and 214 therebetween. When power plug 220 is plugged into the AC supply, light string 200 is powered by light string controller 202, and the light beads 206(1-n) can be illuminated to generate any of a plurality of desired light outputs as will be described below.

It should also be noted that connectors 214, 216, 218 enable the components of light string 200 to be separated and light string 200 expanded. However, in other embodiments, components of light string 200, including multiple pluralities of light beads 206(1-n), can be made as an inseparable structure.

Figure 3:
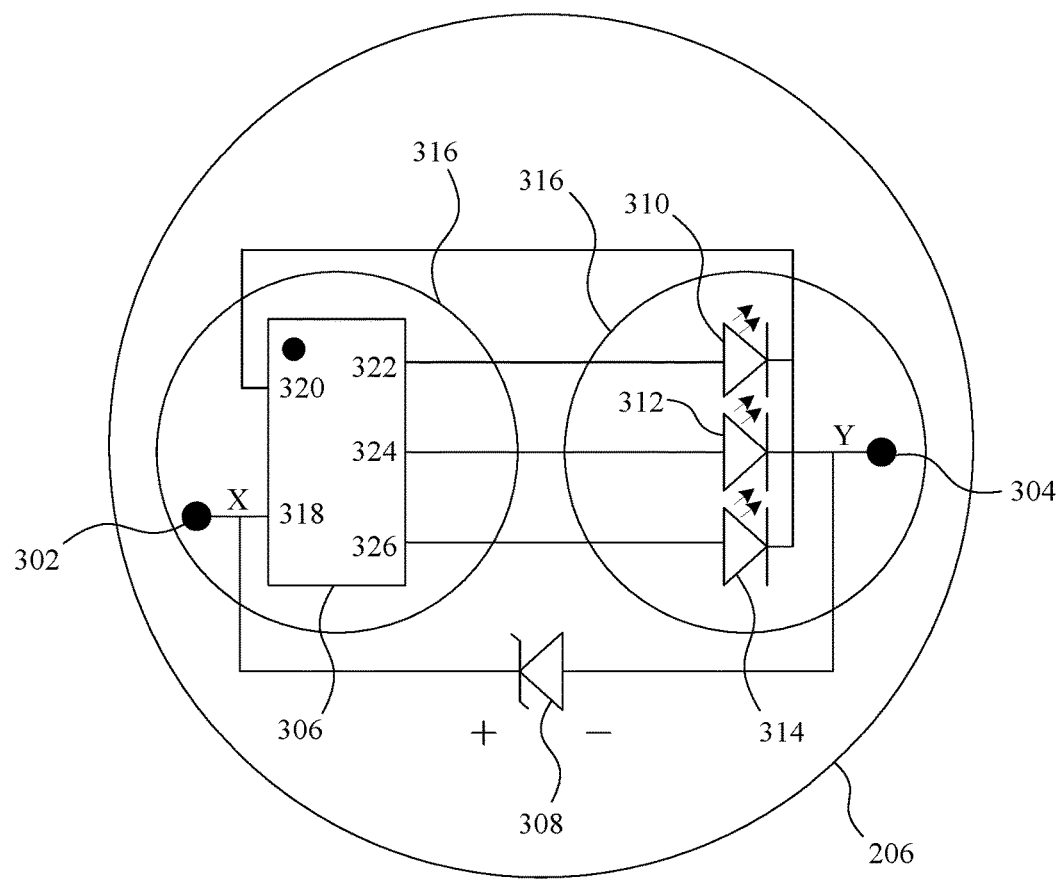
FIG. 3 is a structural schematic view of a light bead of FIG. 2 according to an embodiment of the present invention.

FIG. 3 is a structural schematic view showing one of light beads 206(1-n) in greater detail. Light bead 206 includes a first voltage supply terminal 302, a second voltage supply terminal 304, a light bead controller 306, a voltage regulator 308, and a plurality of light-emitting elements. The plurality of light-emitting elements includes a first light-emitting element 310, a second light-emitting element 312, and a third light-emitting element 314. Light bead 206 also includes one or more (two shown) support members 316, which support and optionally facilitate electrical connections between the elements of light bead 206.

First voltage supply terminal 302 is the positive voltage node (labeled "X") of light bead 206, whereas second voltage supply terminal 304 is the negative voltage node (labeled "Y"). As will be explained further below, transmission of control signals from light string controller 202 (FIG. 2) are back-ordered through the plurality of light beads 206(1-n), being received at each light bead 206 via second voltage supply terminal 304 and provided to the next light bead 206 in the series via first voltage supply terminal 302. Accordingly, light bead 206 includes a means (e.g., a soldered connection, pin, connector, etc.) for electrically connecting each of voltage supply terminals 302 and 304 to an adjacent light bead 206, current limiting resistor 212, or voltage supply line.

Light bead controller 306 includes a first input terminal 318, a second input terminal 320, and a plurality (three in this embodiment) of drive terminals 322, 324, and 326. First input terminal 318 is electrically coupled to first voltage supply terminal 302, whereas second input terminal 320 is electrically coupled to second voltage supply terminal 304 at node Y. Each of light emitting elements 310, 312, and 314 is electrically connected between a respective one of drive terminals 322, 324, and 326, and second voltage supply terminal 304 at node Y. Here, because light bead controller 306 is operative to independently power each of light emitting elements 310, 312, and 314, the number of drive terminals is at least equal to the number of light-emitting elements.

Voltage regulator 308 regulates the voltage between first and second voltage supply terminals 302 and 304. Here, voltage regulator 308 comprises a Zener diode coupled between first and second voltage supply terminals 302 and 304 in reverse bias. Accordingly, Zener diode 308 maintains the voltage between first and second voltage supply terminals 302 and 304 at its Zener voltage, as long as the voltage between terminals 302 and 304 is greater than or equal to its Zener voltage. In a particular embodiment, Zener diode 308 has a Zener voltage of 3.3 Volts and a power rating of 0.25 Watts.

Light bead controller 306 is electrically coupled to first and second voltage supply terminals 302 and 304, in parallel with Zener diode 308, and is configured to detect control signals received via second voltage supply terminal 304. In a particular embodiment, a control signal is encoded as a series of voltage pulses, which identifies one of a plurality of illumination programs stored by light bead controller 306. The control signal is received on voltage supply terminal 304 and provided to light bead controller 306 at second input terminal 320. The control signal is also transmitted to Node X and first voltage supply terminal 302 via Zener diode 308. Responsive to a control signal being received, light bead controller 306 identifies an illumination program associated with the control signal from a plurality of available illumination programs. After assertion of the control signal, light bead controller 306 selectively powers one or more of light emitting elements 310, 312, and 314 according to the identified illumination program via one or more of drive terminals 322, 324, and 326, such that light bead 206 generates the desired illumination output (light color and/or effect).

Light emitting elements 310, 312, and 314 enable light bead 206 to produce multiple colors of light. First light-emitting element 310 comprises a first light emitting diode (LED) that emits light of a first color (e.g., red), second light-emitting element 312 comprises a second LED that emits light of a second color (e.g., green), and third light-emitting element 314 comprises a third LED that emits light of a third color (e.g., blue). More specifically, LED 310 provides a red light source of 600-700 nm wavelength, LED 312 provides a green light source of 500-600 nm wavelength, and LED 314 provides a blue light source of 400-500 nm wavelength. Because each of LEDs 310, 312, and 314 generates a different color of light and can be illuminated by controller 306 independently, light bead 206 can selectively generate any of seven different colors. Those colors are red, green, blue, yellow (red and green), magenta (red and blue), cyan (green and blue), and white (red, green, and blue). Additionally, light bead controller 306 can cause the light bead 206 to flash, change intensity, switch colors in alternation, turn off, etc. according to any of its predefined illumination programs. LEDs 310, 312, and 314 can be embodied, for example, in respective silicon chips. LEDs 310, 312, and 314 can also be embodied as standard LEDs, rather than the surface mount (SMD) variety, which lowers cost.

Figure 4:
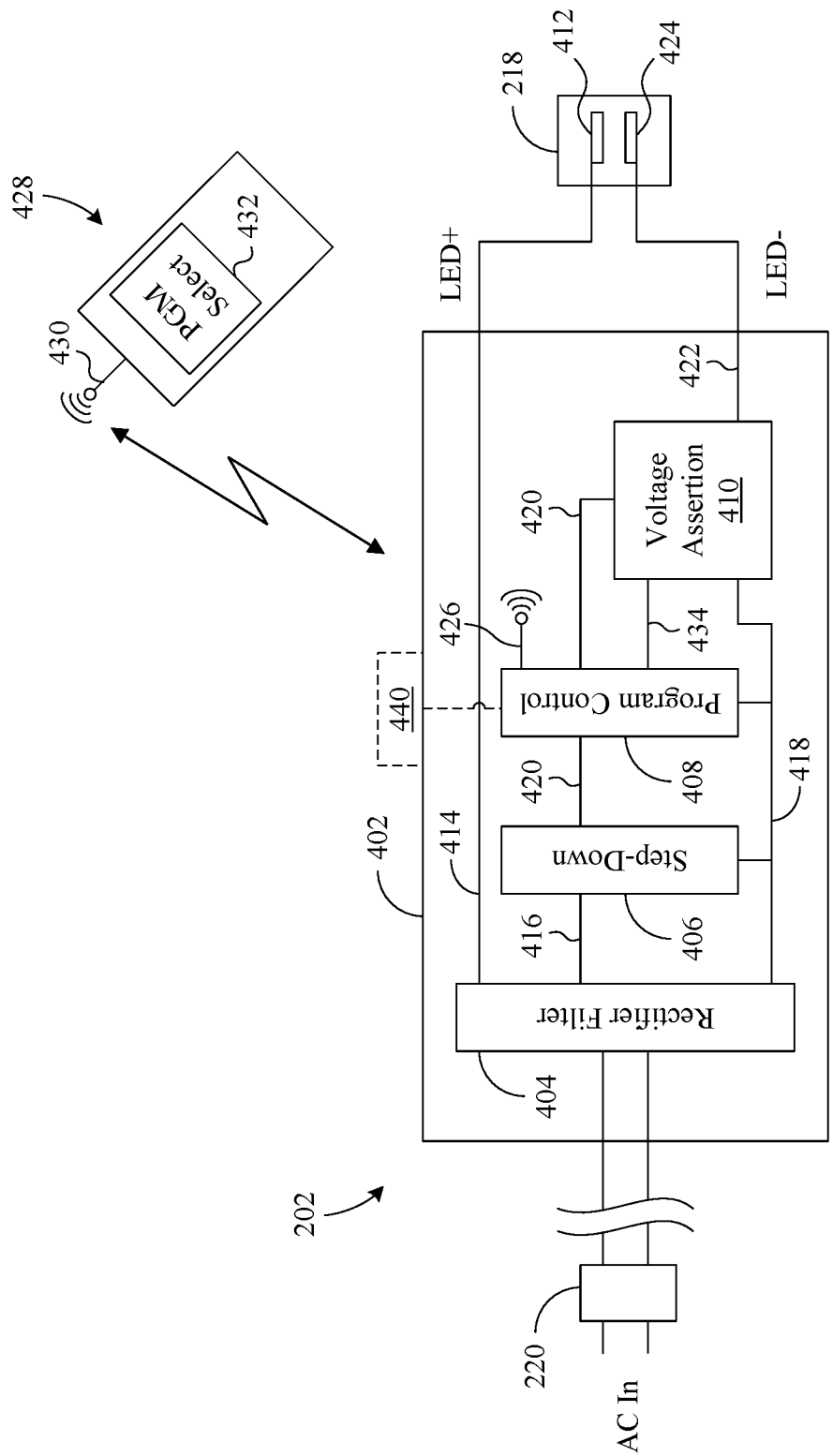
FIG. 4 is a structural schematic view of the light string controller of FIG. 2 according to an embodiment of the present invention.

FIG. 4 is a structural schematic view of light string controller 202 (FIG. 2) according to an embodiment of the present invention. Light string controller 202 includes a housing 402, a rectifier filter 404, step-down circuitry 406, a program control unit 408, and a voltage assertion unit 410. Rectifier filter 404 receives 120 volt AC power when power plug 220 is plugged into a wall outlet (not shown), and rectifies and conditions the AC power into filtered DC power. During operation, rectifier filter 404 provides a first drive voltage (e.g., 170V DC) to a first drive voltage terminal 412 of connector 218, via a first drive voltage line 414, and also to step-down circuitry 406 via line 416. Rectifier filter 404 also provides a second voltage (e.g., 0V DC) to step down circuitry 406, program control unit 408, and voltage assertion unit 410 via line 418.

Step down circuitry 406 reduces the high voltage from rectifier filter 404 to a lower voltage (e.g., 5V DC), and provides the stepped-down voltage to program control unit 408 and to voltage assertion unit 410 via line 420. Program control unit 408 comprises integrated circuitry and causes control signals for light beads 206(1-n) to be output by light string controller 202. More particularly, program control unit 408 causes voltage assertion unit 410 to selectively assert a series of voltage pulses on a second drive voltage line 422 and, thus, on a second drive voltage terminal 424 of connector 218 as a control signal. When connected with light segment 204, the control signal is communicated to the series-connected light beads 206(1-n) via second voltage supply line 210.

Light string controller 202 also includes a user interface, which facilitates user control over the light output of light segment 204. In this example, the user interface comprises a wireless interface 426, in communication with program control unit 408, and a remote control 428. Remote control 428 communicates (e.g., by infrared (IR), radio, Bluetooth, etc.) with wireless interface 426 of program control unit 408 using a complementary wireless interface 430. Remote control unit 428 also includes one or more program selection input(s) 432, which enables a user to select a desired operation for light segment(s) 204. Program selection input(s) 432 can, for example, comprise button(s), knob(s), switch(es), a smartphone application, etc. In the case of a smartphone application, the application can communicate with program control unit 408 via Bluetooth and/or an IR port of the smartphone.

Program selection inputs 432 can be incorporated into controller 202 as an alternative, or in addition, to remote control 428. In one such example, light string controller 202 includes a simplified user input, such as a single selector 440 (e.g., a rotatable knob, etc.) in communication with program control unit 408. Knob 440 is rotated by the user to different angular positions to select a desired light output of light segment 204. In one example, knob 440 is rotated by the user to select from the following three light outputs: (1) steady white light, (2) steady multi-color light (different light beads 206(1-*n*) in the light segment produce different colors simultaneously), and (3) color changing from white to multi-color output.

When a user selects a desired operation/output for light segment 204, program control unit 408 receives the program selection signal and identifies at least one control signal to provide to light beads 206(1-*n*) to implement the user's program selection. Then, program control unit 408 causes voltage assertion unit 410 to assert the identified control signal on second drive voltage terminal 424. More particularly, program control unit 408 controls voltage assertion unit 410 via one or more line(s) 434 to selectively assert each identified control signal on voltage terminal 424 as an encoded series of voltage pulses having predefined signal characteristics (e.g., frequency, time interval, pulse weight, etc.).

Responsive to control input from program control unit 408, voltage assertion unit 410 asserts either a steady-state voltage or a pulse of a control signal on second drive voltage line 422 and second drive terminal 424. In a particular example, the control input comprises a series of activation pulses output by program control unit 408, which corresponds to the control signal that needs to be output from light string controller 202. When program control unit 408 is not asserting an activation pulse on control line 434, voltage assertion unit 410 asserts the second drive voltage (e.g., 0V, etc.) on second drive voltage line 422. Conversely, when program control unit 408 asserts an activation pulse on control line 434, voltage assertion unit 410 causes a corresponding pulse to be asserted on second drive voltage line 422 at a voltage (e.g., 5V DC) that is different than the steady state drive voltage. Thus, an encoded multi-pulse control signal, is communicated to the light beads 206(1-*n*) via terminal 424. In a particular embodiment, voltage assertion unit 410 comprises a silicon controlled rectifier (SCR).

In summary, with reference to FIGS. 2-4, the working mechanism of the embodiment is that, within the light string controller 202, a control signal of the controller 202 is fused and transmitted together with a power supply signal. That is, a control signal of light string controller 202 is transmitted to a first light bead 206(*n*) via the negative pole of the power supply circuit, which here includes second drive terminal 424 of controller 202 and second voltage supply line 210 of light segment 204. After light bead controller 306 in light bead 206(*n*) receives the control signal, a first light-emitting element 310, a second light-emitting element 312, and a third light-emitting element 314 of the light bead 206(*n*) are controlled by light bead controller 306 to emit light according to the illumination program identified by the control signal. Additionally, the control signal is further fused to the voltage supply terminal 302 of the light bead 206(*n*), such that it is transmitted to a next light bead 206(*n*–1), and so on. Thus, the control signal is transmitted from one light bead to another, thereby achieving R/G/B full-color and/or flicker change of the whole product in accordance with the control signal.

The invention provides the advantage that the light string 200 is simple in construction, utilizing only two voltage supply lines 208 and 210 and including inexpensive light beads having controllable, variable color illumination outputs. A connectable controller encodes control signals on one of the voltage supply lines to control the light output of the light beads. The light beads can be operated according to any of a plurality of predefined illumination programs, including seven different colors, multi-color, flicker, gradation/dimming, etc. The invention also provides the advantage that multiple light segments are connectable according to the actual needs of a user, such that the light string is expandable.

Figure 5:
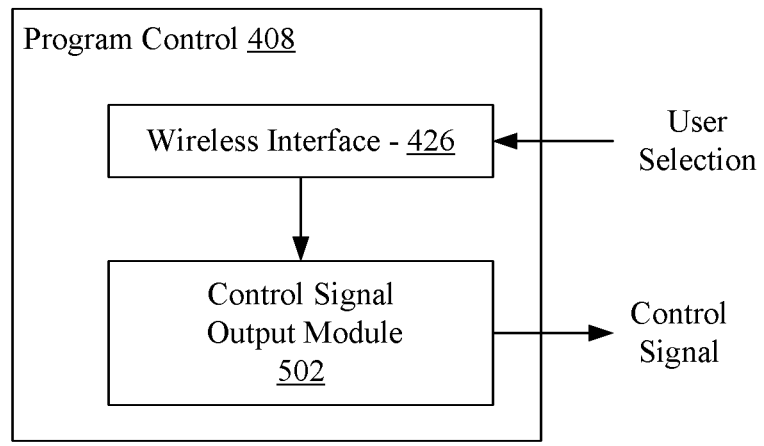
FIG. 5 is a block diagram showing the program control unit of FIG. 4 in greater detail.

FIG. 5 is a block diagram showing program control unit 408 in greater detail to include a control signal selection module 502 in addition to wireless interface 426. When wireless interface 426 receives a program selection signal indicative of a light output selected by a user, it provides the program selection signal to control signal output module 502. Control signal output module 502 then provides an output (e.g., a series of activation pulses) corresponding to a desired control signal indicative of the selected program to voltage assertion unit 410. In a particular embodiment, control signal output module 502 stores a plurality of unique control signal definitions corresponding to different illumination programs stored by light beads 206(1-*n*) and to different program selection signals provided by remote control 428.

Figure 6:
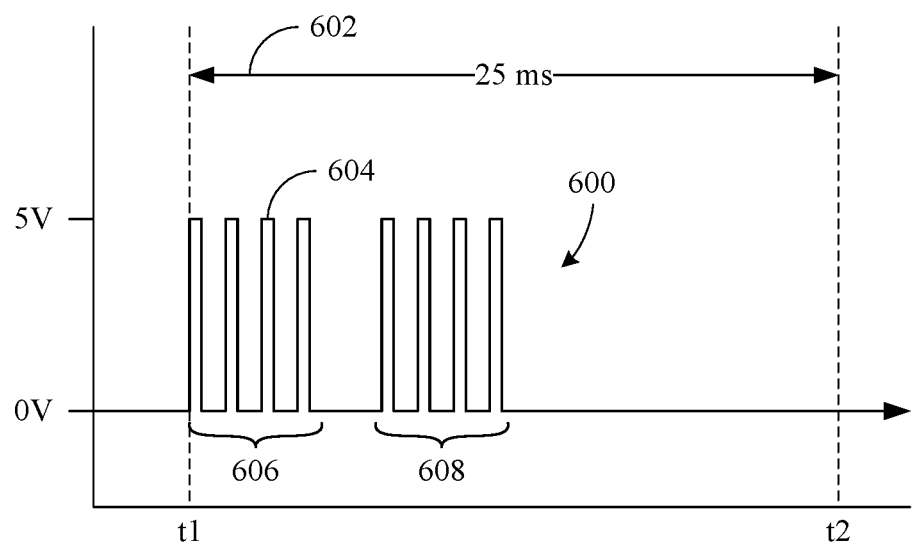
FIG. 6 is a voltage verses time diagram showing an exemplary multi-pulse control signal generated by the light string controller of FIG. 4.
Figure 7A:
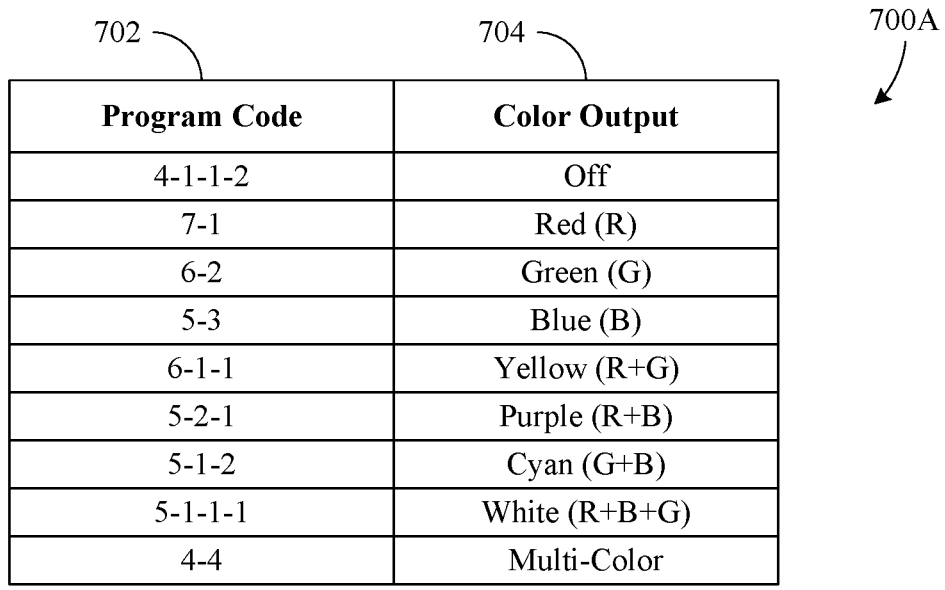
FIGS. 7A-7D are tables showing exemplary pulse-coding schemes for control signals generated by the light string controller of FIG. 4.
Figure 7B:
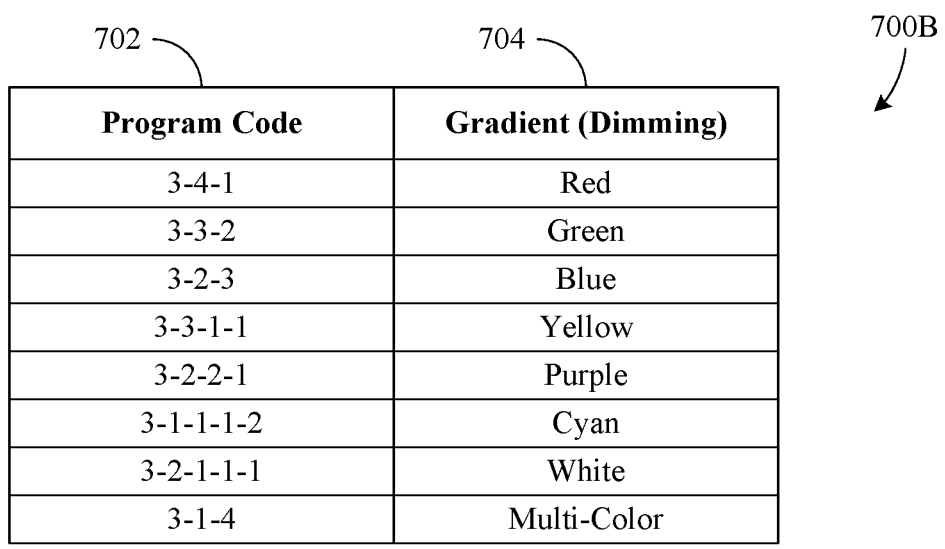
Figure 7C:
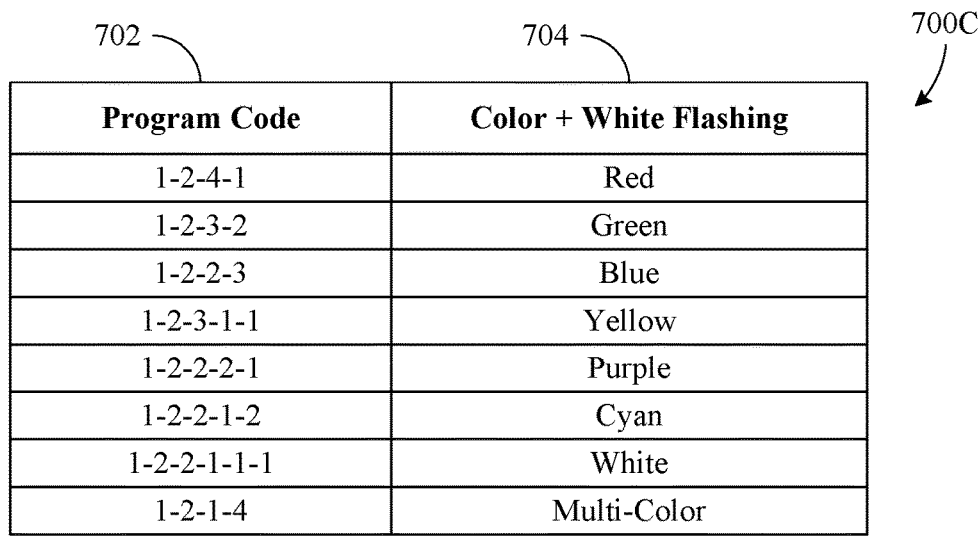
Figure 7D:
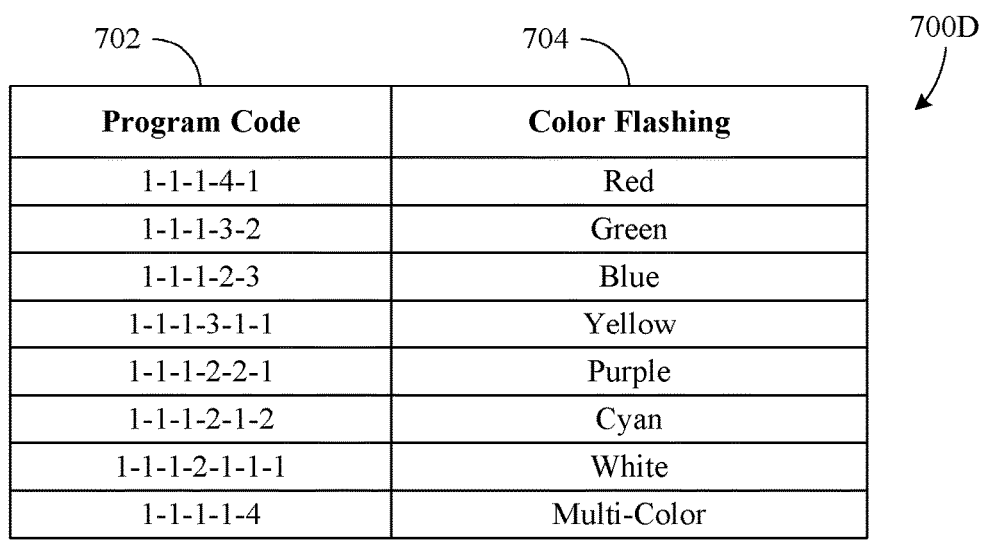

In one embodiment, the control signal output by light string controller 202 on voltage supply line 210 is encoded based on frequency of the pulse signals. FIG. 6 is a Voltage vs. Time diagram illustrating an exemplary multi-pulse control signal 600 provided to light segment 204. Control signal 600 is asserted within a pulse window 602 between times t1 and t2, which in this example is 25 milliseconds. Control signal 600 is encoded using eight pulses 604 of constant duration, where the eight pulses 604 are separated into groups. The time interval between consecutive pulses 604 of the same group is short (corresponding to a higher frequency), whereas the time interval between the last and first pulses of consecutive groups is relatively longer (corresponding to a lower frequency).

As the example in FIG. 6 shows, control signal 600 includes a first group 606 of four pulses 604 followed by a second group 608 of four pulses 604, which represent an illumination program code of "4-4". The time between pulses 604 in each of groups 606 and 608 is short, whereas the time between the last and first pulses of consecutive groups 606 and 608 is relatively longer. Accordingly, light bead controller 306 can detect this relatively long time period to distinguish groups 606 and 608. Light bead controller 306 can also detect the number of pulses 604 within each group based on their more frequent occurrence. As another example, an illumination program code of 5-2-1 can be encoded as three groups of pulses, with the first group containing five pulses 604, the second group containing two pulses 604, and the third group containing one pulse 604. The first-and-second and the second-and-third groups would also be separated by longer time intervals than the pulses within the individual groups.

It should be noted that the control signal encoding scheme shown in FIG. 6 is exemplary and other coding schemes can be used. For example, light string controller 202 can use a coding scheme that encodes different illumination program codes as a set of pulses of differing weights (durations). Accordingly, pulse 600 would be encoded as two pulses of the same duration (i.e., four time intervals each). Similarly, program code 5-2-1 would be encoded as three pulses having durations of five time intervals, two time intervals, and one time interval, respectively, for a total pulse weight of eight time intervals. Thus, various pulse-coding schemes can be used.

FIGS. 7A-7D are tables 700A-700D associating exemplary program codes for multi-pulse control signals and illumination programs/outputs produced by light beads 206 (1-*n*) in response to receiving the control signals. Each of tables 700A-700D includes a first column 702, showing illumination program codes (identifiers) for different control signals, and a second column 704 showing illumination programs. Each row of tables 700A-700D associates a control signal's program code with an illumination program/output for light beads 206(1-n).

Table 700A shows program codes in column 702 associated with solid color outputs of light beads 206(1-n) in column 704. Note that the program code of 4-4 (two groups of four pulses) will cause light segment 204 to generate a multi-color output, which causes different pluralities of light beads 206(1-n) in light segment 204 to illuminate in different colors. Responsive to a multi-color code, a first plurality of light beads 206 will illuminate with a first color in column 704, whereas a second plurality of light beads 206 will illuminate with a second (different) color in column 704, and so on. Given that there are seven colors, up to seven pluralities of light beads 206 having different colors can be defined in multi-color mode.

As some additional examples, table 700A shows that the program code 5-2-1 causes light beads 206(1-n) to display purple (e.g., by illuminating red LED 310 and blue LED 314). A program code of 4-1-1-2, which is comprised of four groups having, respectively, four pulses, one pulse, one pulse, and two pulses, will cause light beads 206(1-n) to turn off. A pulse code of 5-1-1-1 will cause the light beads 206(1-n) to generate white light. Thus, by asserting the program codes in table 700A, light beads 206(1-n) can be turned off or turned on to produce any of red, green, blue, yellow, purple, cyan, white, and multi-color as indicated.

Tables 700B-700D show other associated program codes and illumination outputs of light beads 206(1-n). Table 700B shows program codes associated with gradient/dimming outputs of light beads 206(1-n) for each color and multi-color output. Table 700C shows program codes associated with "color-plus-white" flashing outputs of light beads 206 (1-n), where white and the color (or multi-color) flash according to some pattern (e.g., in alternation). If "white" is selected (code 1-2-2-1-1-1), then light beads 206(1-n) can flash in a predetermined pattern. Table 700D shows pulse codes associated with light beads 206(1-n) flashing in one color or in multi-color. If "white" is selected, then light beads 206(1-n) flash in a predetermined pattern, optionally different than that associated with Table 700C.

It should also be noted that the program codes associated with tables 700A-700D are coded by type of light output. For example, the first group of pulses in each of the codes for solid colors (and "Off") in column 702 of table 700A has four pulses or more. In table 700B for gradient/dimming output, the first group of pulses of each program code includes three pulses. In table 700C, each of the "color-plus-white" flashing codes begins with a first group of one pulse followed by a second group of two pulses. Finally, in table 700D, each of the single color flashing codes begins with three consecutive groups of one pulse each.

Returning briefly to FIG. 4, where light string controller 202 includes knob 440 (FIG. 4), knob 440 can be rotated by the user to select a particular type of desired light output (e.g., solid, gradient, color+white flashing, color flashing, etc.). Once selected, program control unit 408 causes control signals to be generated by light string controller 202 within the selected type (e.g., within one of tables 700A-700D) so that light segment 204 is illuminated accordingly.

As mentioned previously, knob 440 can also select between predefined lighting routines, for example, (1) steady white light, (2) steady multi-color output, and (3) color changing from white to multi-color output. In such an embodiment, program control unit 408 causes control signals to be generated that correspond to the selected predefined lighting routine. If the user selects predefined lighting routine (1), light string controller 202 outputs a control signal corresponding to program code 5-1-1-1 to cause all light beads 206(1-n) to turn white. Similarly, if the user selects predefined lighting routine (2), light string controller 202 outputs a control signal 600 corresponding to program code 4-4 that causes all light beads 206(1-n) to turn multi-color. If the user selects predefined lighting routine (3), light string controller 202 outputs a control signal for program code 1-2-1-4, which causes the light beads 206(1-n) to display white, then multi-color, then white, and so on.

In other instances, program control unit 408 of light string controller 202 can include programming to generate illumination routines using the program codes 702. For example, program control unit 408 can store a routine that causes program codes 7-1 and 6-2 to be output to light beads 206(1-n) repeatedly in alternation such that light beads 206(1-n) switch from green to red, to green, to red, and so on. As another example, program control unit 408 can include a routine that loops through all colors in gradient mode by causing the program codes in column 702 of table 700B to be provided to light segment 204 in some order, such as 3-4-1, 3-3-2, 3-2-3, etc. This generates red light with dimming, green light with dimming, blue light with dimming, etc. As another example, program control unit 408 can send a random series of program codes to light beads 206(1-n) to illuminate light segment 204 at random. Such routines can be stored in program control unit 408 and can be user selectable via program selection input 432, such that they and the illumination programs stored by light beads 206(1-n) can be used in conjunction.

Figure 8:
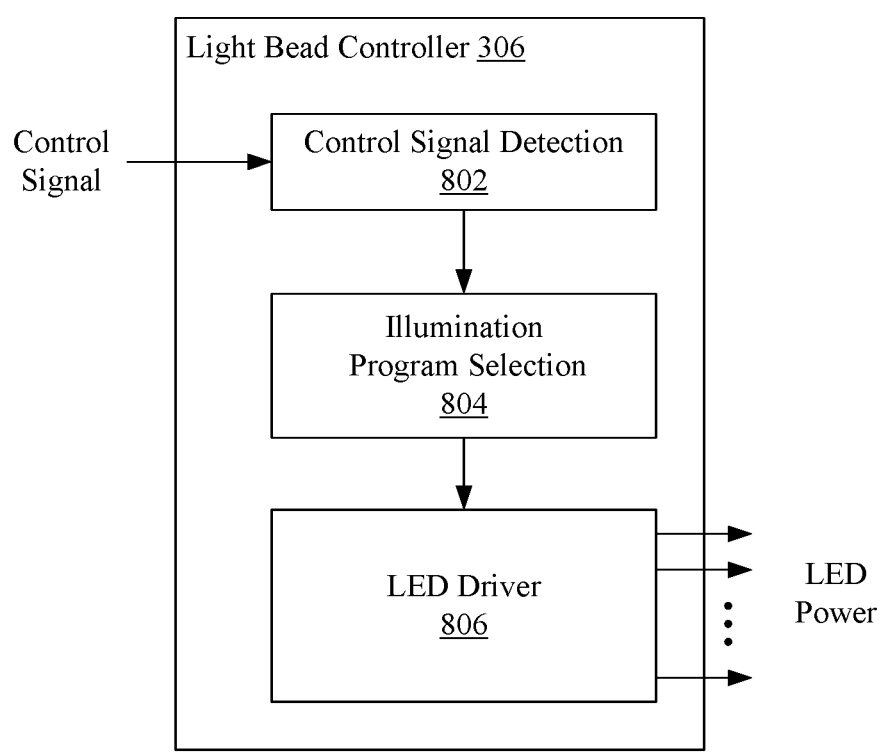
FIG. 8 is a block diagram showing the light bead controller of the light bead of FIG. 3 in greater detail.

FIG. 8 is a block diagram showing light bead controller 306 in greater detail. Light bead controller 306 includes a control signal detection module 802, an illumination program selection module 804, and an LED driver 806. In the present embodiment, light bead controller 306 is an integrated circuit chip having modules 802 and 804 and driver 806 formed therein.

The modules of light bead controller 306 provide the following functions. Control signal detection module 802 detects control signals communicated via second voltage supply terminal 304, resolves the program code thereof, and provides the program code to illumination program selection module 804. In a particular embodiment, control signal detection module 802 detects changes in the available current flowing through light bead controller 306 responsive to each pulse 604 of the control signal to determine its program code. In some embodiments, control signal detection module 802 can be triggered into action by changes in available current caused by receipt of the first pulse of a control signal.

Illumination program selection module 804 stores a plurality of predefined illumination programs, such as the illumination programs in columns 704 of tables 700A-700D, in association with a plurality of program codes, such as those in columns 702 of tables 700A-700D, where each of the illumination programs causes a different light output of light bead 206. Illumination program selection module 804 receives a program code from control signal detection module 802, associates the program code with one of the plurality of illumination programs stored therein, and outputs LED control signals indicative of the associated illumination program to LED driver 806. LED driver 806 receives the LED control signals and, in response, provides power to one or more of drive terminals 322, 324, and 326 to illuminate one or more of LEDs 310, 312, and 314, respectively, in accordance with the illumination program.

Thus, light bead 206 illuminates according to the selected illumination program until another control signal is received.

Multi-color output of light strand 204 can be accomplished in the programming light bead controller 306 in several ways. In one embodiment, responsive to receiving a program code that requires multi-color output, illumination program selection module 804 can select one of the colors (e.g., red, green, blue, yellow, purple, cyan, and (optionally) white) at random, and then controls LED driver 806 to cause the associated light bead 206 to generate the randomly selected color. Thus, for a light strand having 50 light beads 206(1-50) each selecting at random from seven available colors (including white), there will be about seven light beads 206 displaying each color. Another option is to program different sets of light beads 206(1-n) to display different colors in multi-color mode. For example, a first group of light beads 206(1-n) can be programmed to display a first color (e.g., red), a second group a second color (green), a third group a third color (blue), etc. The number of programmed groups or number of selectable colors for multi-color mode can also be configured as desired.

Figure 9:
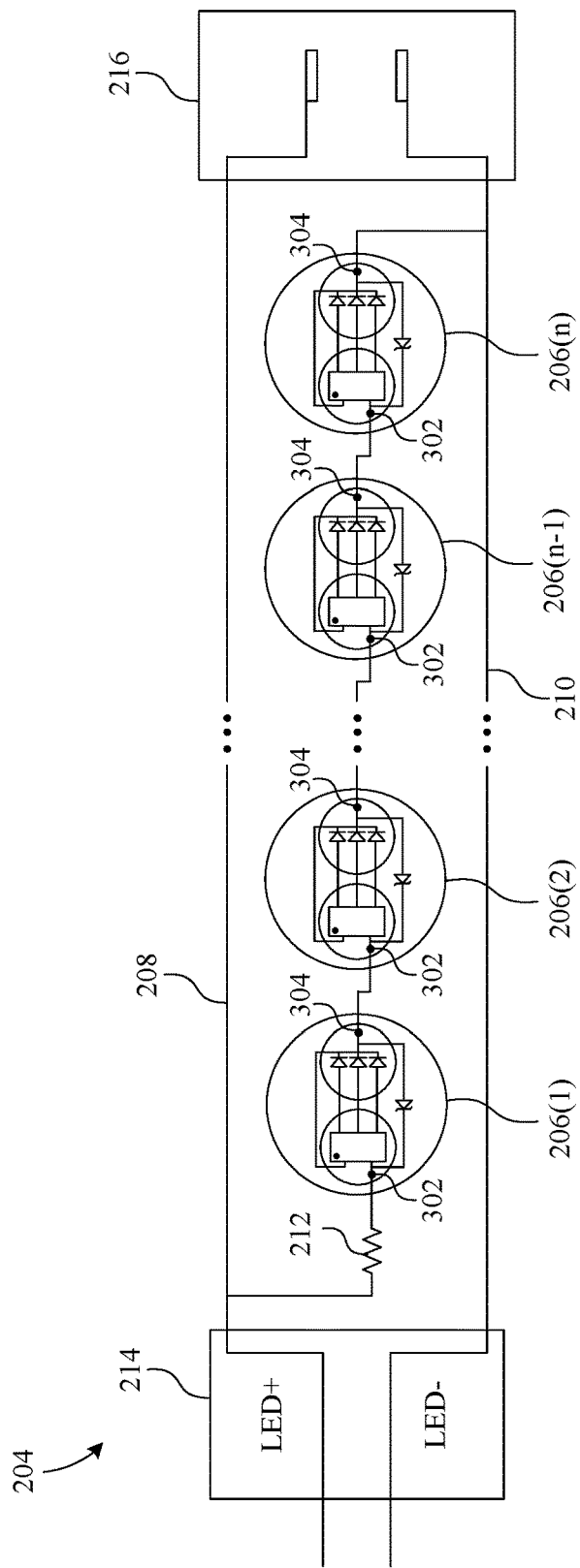
FIG. 9 is a schematic view showing the light segment of FIG. 2 in greater detail.

FIG. 9 is a schematic view of light segment 204 showing the connections between light beads 206(1-n) in greater detail. FIG. 9 shows that the first voltage supply terminal 302 of the first light bead 206(1) in the series is electrically coupled to first voltage supply line 208 via current-limiting resister 212, and the second voltage supply terminal 304 of light bead 206(1) is electrically connected to the first voltage supply terminal 302 of the second light bead 206(2). The second voltage supply terminal 304 of second light bead 206(2) would similarly be connected to the first voltage supply terminal 302 of a third light bead 206(3) (not shown in FIG. 9) and so on. Near the end of the series, a second-to-last light bead 206(n-1) has its first voltage supply terminal 302 electrically connected to the second voltage supply terminal 304 of a third-to-last light bead 206(n-2) (not shown) and has its second voltage supply terminal 304 connected to the first voltage supply terminal 302 of last light bead 206(n). The second voltage supply terminal of 304 of last light bead 206(n) is connected to second voltage supply line 210.

In the present embodiment, first and second voltage supply lines 208 and 210 are insulated conductive wires having light beads 206(1-n) connected in series therebetween, for example, as discrete modules. Thus, light segment 204 has a traditional string-like appearance. In other embodiments, light segment 204 can be in a light belt form, for example, including an elongated flexible circuit substrate having the elements of light beads 206(1-n) mounted thereon at regular intervals and powered by first and second conductive traces 208 and 210 formed on the circuit substrate. Light segment 204 can also include lenses over each individual light bead and/or a tubular sheath surrounding the light segment 204, etc.

Figure 10:
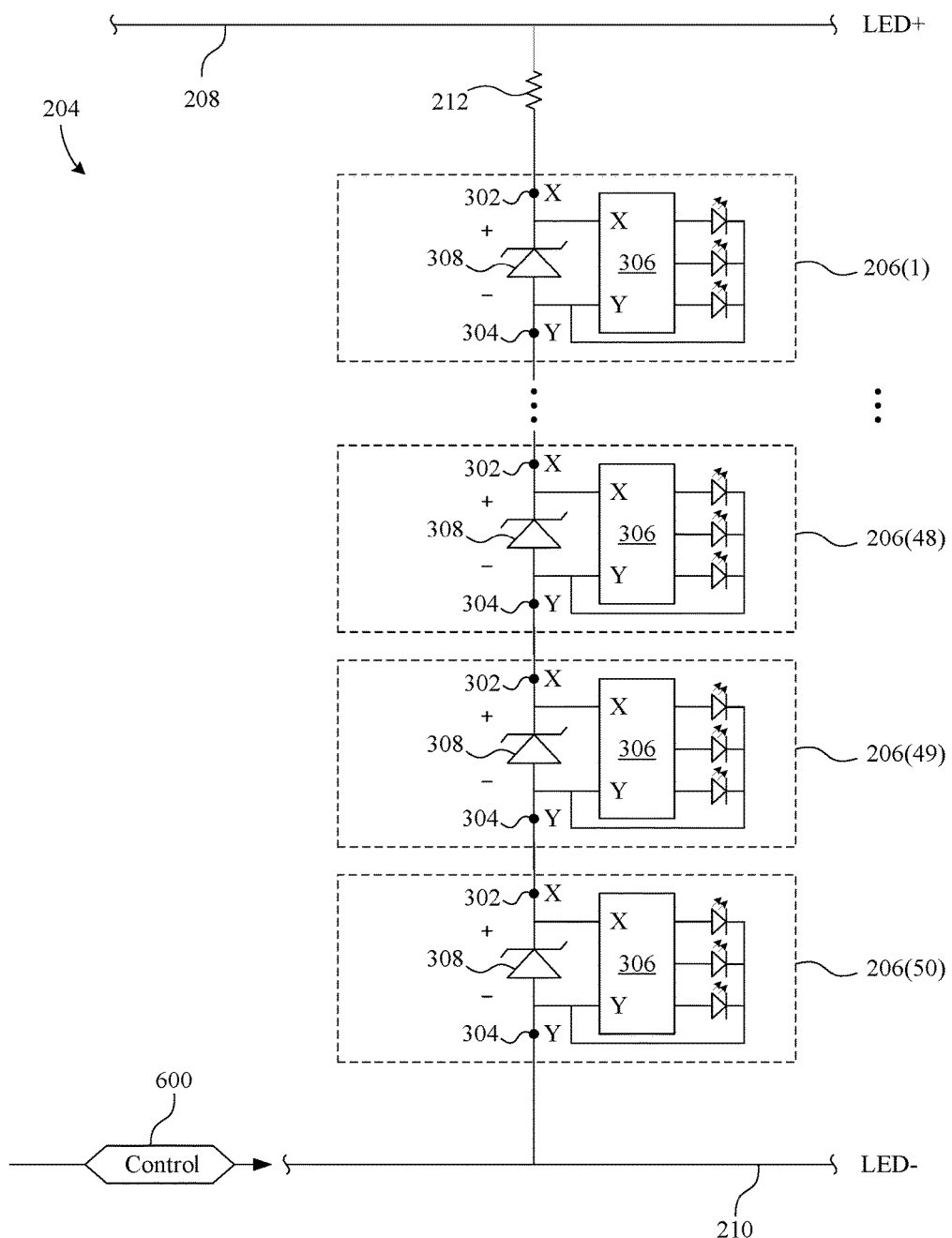
FIG. 10 is a circuit diagram of the light segment of FIG. 2.

FIG. 10 is a circuit diagram showing a light segment 204 having fifty light beads 206(1-50) connected in series along with current-limiting resistor 212 between first voltage supply line 208 (LED+) and second voltage supply line 210 (LED−). At steady state, light string controller 202 asserts 170V DC and 0V DC on first and second voltage supply lines 208 and 210, respectively. During steady state, the Zener diode 308 in each light bead 206 acts as a voltage regulator, maintaining the voltage across the first and second voltage supply terminals 302 and 304 of that light bead 206 at 3.3V. The combined voltage across the fifty light beads 206(1-50) is, therefore, 165V DC (i.e., 3.3V×50). The remaining voltage is accounted for across current-limiting resistor 212, and the available current to each of light beads 206(1-50) is maximum.

FIG. 10 also shows that light string controller 202 has asserted a multi-pulse control signal 600 on negative voltage supply line 210, where each pulse 604 is asserted at 5V DC. When a pulse is asserted on node 304 of light bead 206(50), the pulse is quickly communicated up the chain of Zener diodes 308 in light beads 206(50-1), and the voltage between first and second voltage supply lines 208 and 210 falls to 165V DC. This voltage is sufficient for the chain of Zener diodes 308 to continue regulating voltage for their respective light beads 206(1-50), but causes the voltage across, and the current through, the current-limiting resistor 212 to be reduced to a minimum. As a result, the available current to the light beads 206(1-50) is also significantly reduced.

Thus, each control pulse asserted on second voltage supply line 210 limits the available current through the chain of light beads 206(1-n) due to current-limiting resistor 212. Because the reduction in available current coincides with the assertion of each pulse 604 (or lack thereof), the light bead controller 306 of each light bead 206(1-50) is able to detect each pulse 604 and the associated times between consecutive pulses 604 of the control signal 600. Accordingly, light bead controller 306 is able to decipher a program code of the control signal 600, associate the program code with an illumination program stored therein, and then execute the illumination program following assertion of the control signal 600 (e.g., after pulse window 602 closes).

Figure 11:
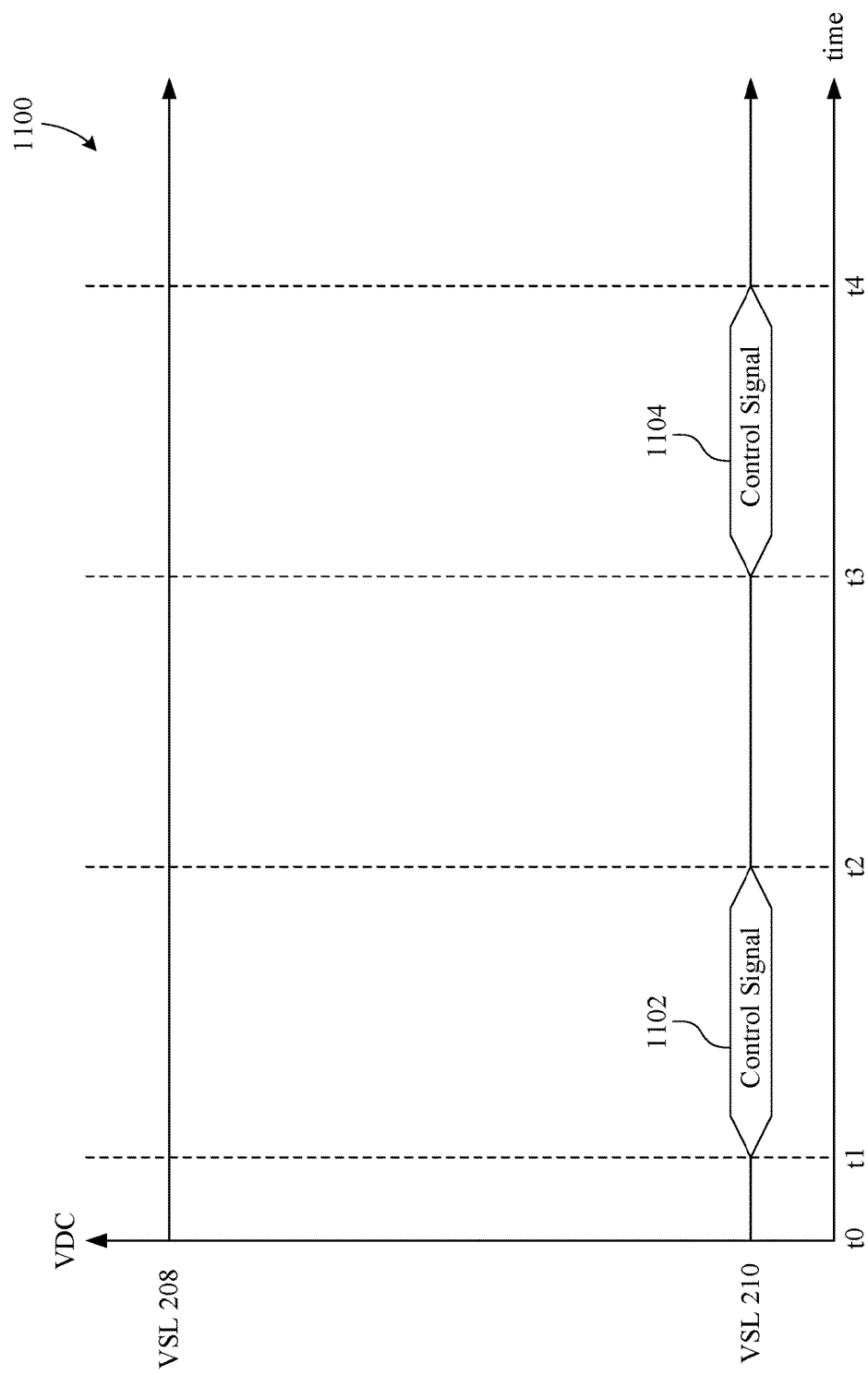
FIG. 11 is a voltage verses time diagram showing sequential control signals asserted by the light string controller of FIG. 2 on the light segment of FIG. 2.

FIG. 11 is a voltage verses time diagram 1100 showing voltages asserted on first voltage supply line 208 and second voltage supply line 210 by light string controller 202 during operation. DC voltage is shown on the vertical axis, and time is shown on the horizontal axis. Light string controller 202 asserts a constant drive voltage (e.g., 170V DC) on first voltage supply line 208 during operation. However, both a constant voltage (e.g., 0V DC) and multi-pulse control signals (e.g., with 5V DC pulses) are selectively asserted on second voltage supply line 210.

From time t0 to time t1, the light beads 206(1-n) operate in steady state according to an initial illumination program. The initial illumination program can, for example, correspond to a default color that is displayed on initial power to light string 200. Then, between times t1 and t2, light string controller 202 asserts a first control signal 1102 on second voltage supply line 210, where first control signal 1102 corresponds to a new illumination program. In this embodiment, first control signal 1102 is a multi-pulse control signal 600 (FIG. 6), but is shown representationally as an elongated hexagon to indicate that other pulse-coding schemes can be used. The light bead controller 306 of each light bead 206(1-n) receives the first control signal 1102, decodes the first control signal 1102, and loads the associated first new illumination program. At time t2, light string controller 202 again asserts a stable voltage on second voltage supply terminal 210 such that the light beads 206(1-n) are illuminated according to the first new illumination program until time t3.

At time t3, light string controller 202 asserts a second control signal 1104 on second voltage supply line 210, where second control signal 1104 corresponds to a second new illumination program. The light bead controller 306 of each light bead 206(1-n) receives the second control signal 1104, decodes it, and loads the associated second new illumination program stored therein. At time t4, light string controller 202 again asserts the steady-state voltage on second voltage supply terminal 210 such that the light beads 206(1-n) are illuminated according to the second new illumination program.

Methods of the present invention will now be described with reference to FIGS. 12-13. For the sake of clear explanation, these methods might be described with reference to particular elements of the previously-described embodiments. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
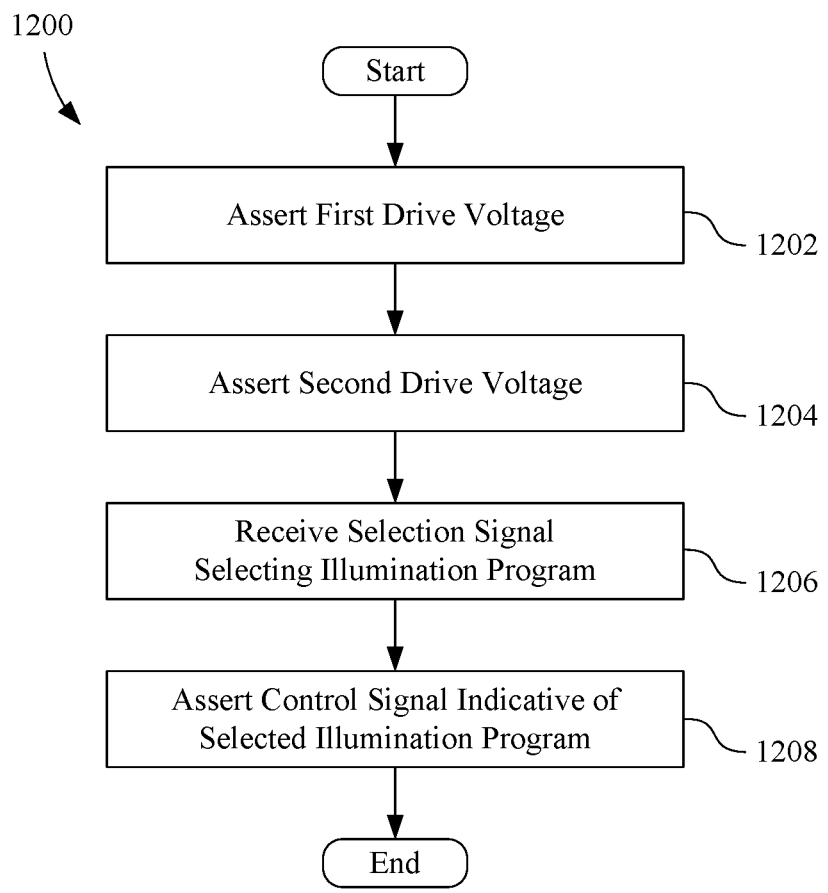
FIG. 12 is a flowchart summarizing a method in a light string controller for controlling the illumination of a plurality of light beads.

FIG. 12 is a flowchart summarizing a method 1200 in a light string controller for controlling the illumination of light beads electrically coupled in series between first and second drive voltage terminals of the controller. In a first step 1202, a first drive voltage is asserted on the first drive voltage terminal of the controller, and in a second step 1204, a second drive voltage is asserted on the second drive voltage terminal. In a third step 1206, a program selection signal is received via a user interface of the light string controller. The program selection signal is indicative of an illumination program selected from a plurality of illumination programs by the user, where each of said illumination programs determines a light output of the plurality of light beads. In a fourth step 1208, a control signal indicative of the selected illumination program is asserted on at least one of the first and second drive voltage terminals to be communicated to each of the plurality of light beads.

Figure 13:
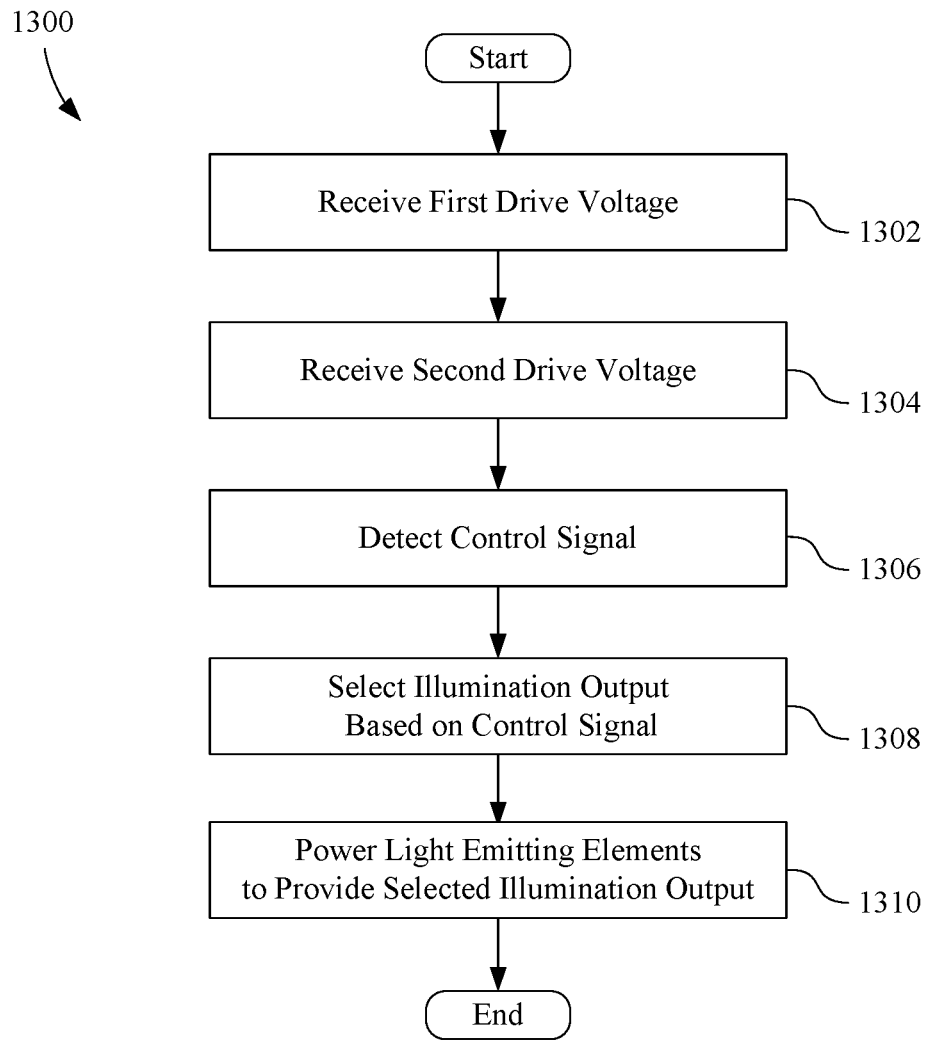
FIG. 13 is a flowchart summarizing a method, in a light bead, for controlling the light output of a light bead having a plurality of light emitting elements.

FIG. 13 is a flowchart summarizing a method 1300 for controlling the light output of a light bead having a plurality of light emitting elements. In a first step 1302, a first drive voltage is received on a first voltage supply terminal, and in a second step 1304, a second drive voltage is received on a second voltage supply terminal. In a third step 1306, a control signal asserted on the second voltage supply terminal is detected, and in a fourth step 1308, one of a plurality of predetermined illumination outputs of the light bead is selected based on the control signal. In a fifth step 1310, one or more of the plurality of light-emitting elements of the light bead is powered to cause the light bead to provide the selected illumination output.

The description of particular embodiments of the present invention is now complete. Many of the described features may be substituted, altered or omitted without departing from the scope of the invention. For example, alternative pulse coding schemes (e.g., pulse-width modulated pulses, etc.) may be substituted for the pulse coding disclosed. As another example, different driving voltages, Zener diodes having different specifications, and/or numbers of light beads in a chain can be employed. These and other deviations from the particular embodiments shown will be apparent to those skilled in the art, particularly in view of the foregoing disclosure.

I claim:

1. A light bead comprising:
    a first voltage supply terminal;
    a second voltage supply terminal;
    a light bead controller electrically coupled between said first and said second voltage supply terminals;
    a plurality of light-emitting elements electrically coupled between said light bead controller and said second voltage supply terminal; and
    a voltage regulator electrically coupled between said first and said second voltage supply terminals in parallel with said light bead controller; and wherein
    said light bead controller is configured to
        detect a control signal asserted on at least one of said first voltage supply terminal and said second voltage supply terminal and
        selectively illuminate one or more of said plurality of light-emitting elements to control the light output of said light bead in accordance with said control signal.

2. The light bead of claim 1, wherein said voltage regulator comprises a Zener diode.

3. The light bead of claim 2, wherein:
    said light bead controller includes
        a first input terminal coupled to said first voltage supply terminal and a positive side of said Zener diode,
        a second input terminal coupled to said second voltage supply terminal and a negative side of said Zener diode, and
        a plurality of drive terminals; and
    each of said plurality of light-emitting elements is electrically coupled between one of said plurality of drive terminals and said second voltage supply terminal.

4. The light bead of claim 1, wherein:
    said plurality of light-emitting elements comprises a first light-emitting diode (LED) configured to emit a first color of light, a second LED configured to emit a second color of light, and a third LED configured to emit a third color of light;
    said first, said second, and said third colors of light are different; and
    said light bead is capable of emitting any of seven different colors of light depending on which of said first, said second, and said third LEDs are illuminated simultaneously.

5. The light bead of claim 4, wherein:
    said first LED provides a red light source of 600-700 nm wavelength;
    said second LED provides a green light source of 500-600 nm wavelength; and
    said third LED provides a blue light source of 400-500 nm wavelength.

6. The light bead of claim 4, wherein:
    said light bead is configured to be electrically coupled as one of a plurality of light beads of a light string;
    said light string comprises a first voltage supply line and a second voltage supply line; and
    said plurality of said light beads are electrically connected to each other in series between said first voltage supply line and said second voltage supply line.

7. The light bead of claim 6, wherein, responsive to said control signal, some of said plurality of light beads are configured to display a first one of said seven different colors and others of said plurality of light beads are configured to display a second one of said seven different colors.

8. The light bead of claim 7, wherein said plurality of light beads are further configured to repeatedly switch between said plurality of light beads all displaying a same color of said seven different colors and said plurality of light beads displaying at least two different colors of said seven different colors.

9. The light bead of claim 6, wherein said light string includes a light string controller operative to:
assert a first drive voltage on said first voltage supply line;
assert a second drive voltage on said second voltage supply line; and
encode said control signal on said second voltage supply line as a series of voltage pulses.

10. The light bead of claim 1, wherein said light bead controller is configured to:
store a plurality of illumination programs;
select one of said plurality of illumination programs based on said control signal; and
illuminate one or more of said light-emitting elements in accordance with said selected illumination program.

11. In a light bead having a plurality of light-emitting elements, a method for controlling the light output of said light bead, said method comprising:
receiving a first drive voltage asserted on a first voltage supply terminal of said light bead;
receiving a second drive voltage asserted on a second voltage supply terminal of said light bead;
detecting a control signal asserted on said second voltage supply terminal;
selecting one of a plurality of predetermined illumination outputs of said light bead based on said control signal; and
powering one or more of said plurality of light-emitting elements to cause said light bead to provide said selected illumination output; and wherein
said step of detecting said control signal comprises detecting a series of voltage pulses asserted on said second voltage supply terminal;
a voltage between said first and said second voltage supply terminals is regulated; and
said step of detecting said control signal comprises detecting changes in available current between said first and said second voltage supply terminals.

12. The method of claim 11, wherein each of said plurality of illumination outputs is associated with a different control signal.

13. The method of claim 12, wherein said plurality of illumination outputs includes a plurality of different colors.

14. The method of claim 13, wherein said plurality of illumination outputs further includes at least one flashing output.

15. The method of claim 13, wherein at least one of said plurality of illumination outputs defines a colored light output of said light bead that forms a component of a multi-colored light output provided by a light string incorporating said light bead and other light beads.

16. The method of claim 12, wherein:
said light bead includes three light-emitting diodes (LEDs), each emitting light of a different color; and
said control signal identifies one of at least 32 different selectable illumination outputs.

17. A light bead comprising:
a first voltage supply terminal;
a second voltage supply terminal;
a light bead controller electrically coupled between said first and said second voltage supply terminals; and
a plurality of light-emitting elements electrically coupled between said light bead controller and said second voltage supply terminal; and wherein
said light bead controller is configured to
detect a control signal asserted on at least one of said first voltage supply terminal and said second voltage supply terminal and
selectively illuminate one or more of said plurality of light-emitting elements to control the light output of said light bead in accordance with said control signal;
said plurality of light-emitting elements comprises a first light-emitting diode (LED) configured to emit a first color of light, a second LED configured to emit a second color of light, and a third LED configured to emit a third color of light;
said first, said second, and said third colors of light are different; and
said light bead is capable of emitting any of seven different colors of light depending on which of said first, said second, and said third LEDs are illuminated simultaneously.

18. The light bead of claim 17, wherein:
said first LED provides a red light source of 600-700 nm wavelength;
said second LED provides a green light source of 500-600 nm wavelength; and
said third LED provides a blue light source of 400-500 nm wavelength.

19. The light bead of claim 17, wherein:
said light bead is configured to be electrically coupled as one of a plurality of light beads of a light string;
said light string comprises a first voltage supply line and a second voltage supply line; and
said plurality of said light beads are electrically connected to each other in series between said first voltage supply line and said second voltage supply line.

20. The light bead of claim 19, wherein, responsive to said control signal, some of said plurality of light beads are configured to display a first one of said seven different colors and others of said plurality of light beads are configured to display a second one of said seven different colors.

* * * * *